(12) United States Patent
Eswaran

(10) Patent No.: US 8,964,763 B2
(45) Date of Patent: Feb. 24, 2015

(54) INTER-ROUTER COMMUNICATION METHOD AND MODULE

(75) Inventor: Anand Eswaran, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 898 days.

(21) Appl. No.: 12/703,168

(22) Filed: Feb. 9, 2010

(65) Prior Publication Data

US 2010/0202466 A1 Aug. 12, 2010

(30) Foreign Application Priority Data

Feb. 9, 2009 (IN) .............................. 273/CHE/2009

(51) Int. Cl.
*H04L 12/56* (2006.01)
*H04L 9/36* (2006.01)
*H04L 12/751* (2013.01)
*H04L 29/06* (2006.01)

(52) U.S. Cl.
CPC ....... *H04L 63/0263* (2013.01); *H04L 2463/141* (2013.01); *H04L 45/02* (2013.01); *H04L 63/1458* (2013.01); *H04L 63/145* (2013.01)
USPC .............. 370/400; 370/252; 713/180; 726/13

(58) Field of Classification Search
USPC ............... 370/252, 352, 395.32, 395.43, 400; 713/168, 170, 180, 181; 726/13, 22–25
See application file for complete search history.

(56) References Cited

U.S. PATENT DOCUMENTS

| 7,209,449 | B2 * | 4/2007 | Tang et al. ..................... 370/238 |
| 7,773,596 | B1 * | 8/2010 | Marques ....................... 370/392 |
| 7,990,993 | B1 * | 8/2011 | Ghosh et al. .................. 370/428 |
| 8,141,156 | B1 * | 3/2012 | Mao et al. ........................ 726/23 |
| 2006/0123481 | A1 * | 6/2006 | Bhatnagar et al. ............... 726/24 |
| 2007/0166051 | A1 * | 7/2007 | Sebayashi et al. ............ 398/177 |
| 2007/0226802 | A1 * | 9/2007 | Gopalan et al. ................. 726/24 |
| 2008/0148404 | A1 * | 6/2008 | Denton ........................... 726/23 |
| 2008/0267189 | A1 * | 10/2008 | Li .................................. 370/392 |
| 2010/0088756 | A1 * | 4/2010 | Balakrishnan et al. .......... 726/13 |
| 2012/0239626 | A1 * | 9/2012 | Aysan et al. ................... 707/674 |
| 2013/0290521 | A1 * | 10/2013 | Labovitz et al. ............... 709/224 |

OTHER PUBLICATIONS

E. Chen, et al., "Address Prefix Based Outbound Route Filter for BGP-4 draft-ietf-idr-bgp-prefix-orf-04.txt" http://web.archive.org/web/20071201...archive.org/.../draft-ietf-idr-bgp-pref . . . , Jan. 21, 2009, pp. 1-7.

(Continued)

*Primary Examiner* — Hassan Phillips
*Assistant Examiner* — Saba Tsegaye

(57) ABSTRACT

A system and method of inter-router communication is described. The system and method include a routing protocol communication, configured to be sent between a plurality of routers on a network, and having a data plane update packet sent with a route update packet. The data plane update packet includes routing attributes corresponding to information export protocol signatures. A signature recognition module may be located on at least one of the routers in the network, and can store and recognize data packet signature patterns located in at least a portion of a payload of the data plane update packet. A data plane filter module can also be located on at least one of the routers, and can handle data packets according to filtering rules for specific data packet signature patterns.

17 Claims, 2 Drawing Sheets

(56) References Cited

OTHER PUBLICATIONS

Jamie Twycross, et al., "Implementing and testing a virus throttle", Hewlett-Packard Company, Proceedings 12th USENIX Security Symposium, Aug. 4-8, 2003, Washington, DC, USA.

Katerina Argyraki, et al., "Active Internet Traffic Filtering: Real-Time Response to Denial-of-Service Attacks", Distributed Systems Group, Stanford University, Apr. 2005.

Ratul Mahajan, et al., "Controlling High Bandwidth Aggregates in the Network?", ICSI Center for Internet Research (ICIR), AT&T Labs Research, Jul. 2002.

Sumeet Singh, et al., "Automated Worm Fingerprinting", Department of Computer Science and Engineering, University of California, San Diego, Dec. 2004.

* cited by examiner

INTER-ROUTER COMMUNICATION METHOD AND MODULE

This application claims priority to Indian patent application Number 273/CHE/2009 filed Feb. 9, 2009, which is incorporated by reference in its entirety for all purposes.

BACKGROUND

Network security management is becoming a more difficult problem as networks grow in size and become a more integral part of society. Attacks on networks are growing due to both the intellectual challenge such attacks represent for hackers and the increasing monetary payoff for the serious attacker. Computer network attacks can take many forms and any one attack may include many different attack types. These attacks can create network damage through mechanisms such as viruses, worms, or Trojan horses, or overwhelming the network's capability in order to cause denial of service, and so forth.

Denial of service attacks are attempts to prevent legitimate users from utilizing or gaining access to computing resources, such as network bandwidth, memory, and CPU bandwidth. Thus, denial of service attacks make a computer resource unavailable to its intended users. Although any shared computer resource could potentially be at risk, typical targets of such attacks include high-profile web servers.

Another type of attack is the computer virus. A computer virus is a computer program that can copy itself and infect a computer without permission or knowledge of the user. Some viruses are programmed to damage the computer by damaging programs, deleting files, or reformatting the hard disk. Other virus programs are not designed to do any damage, but simply replicate themselves and perhaps make their presence known by presenting text, video, or audio messages. Even these less sinister malware programs can create problems for the computer user. They typically take up computer memory used by legitimate programs. As a result, they often cause erratic behavior and can result in system crashes.

Worms and Trojan horses are yet another type of attack. A worm can spread itself to other computers without needing to be transferred as part of a host, and a Trojan horse is a file that appears harmless. Worms and Trojans may cause harm to either a computer system's hosted data, functional performance, or networking throughput, when executed. In general, a worm does not actually harm either the system's hardware or software, while at least in theory, a Trojan's payload may be capable of almost any type of harm if executed.

DETAILED DESCRIPTION OF EXAMPLE EMBODIMENT(S)

Figure 1:
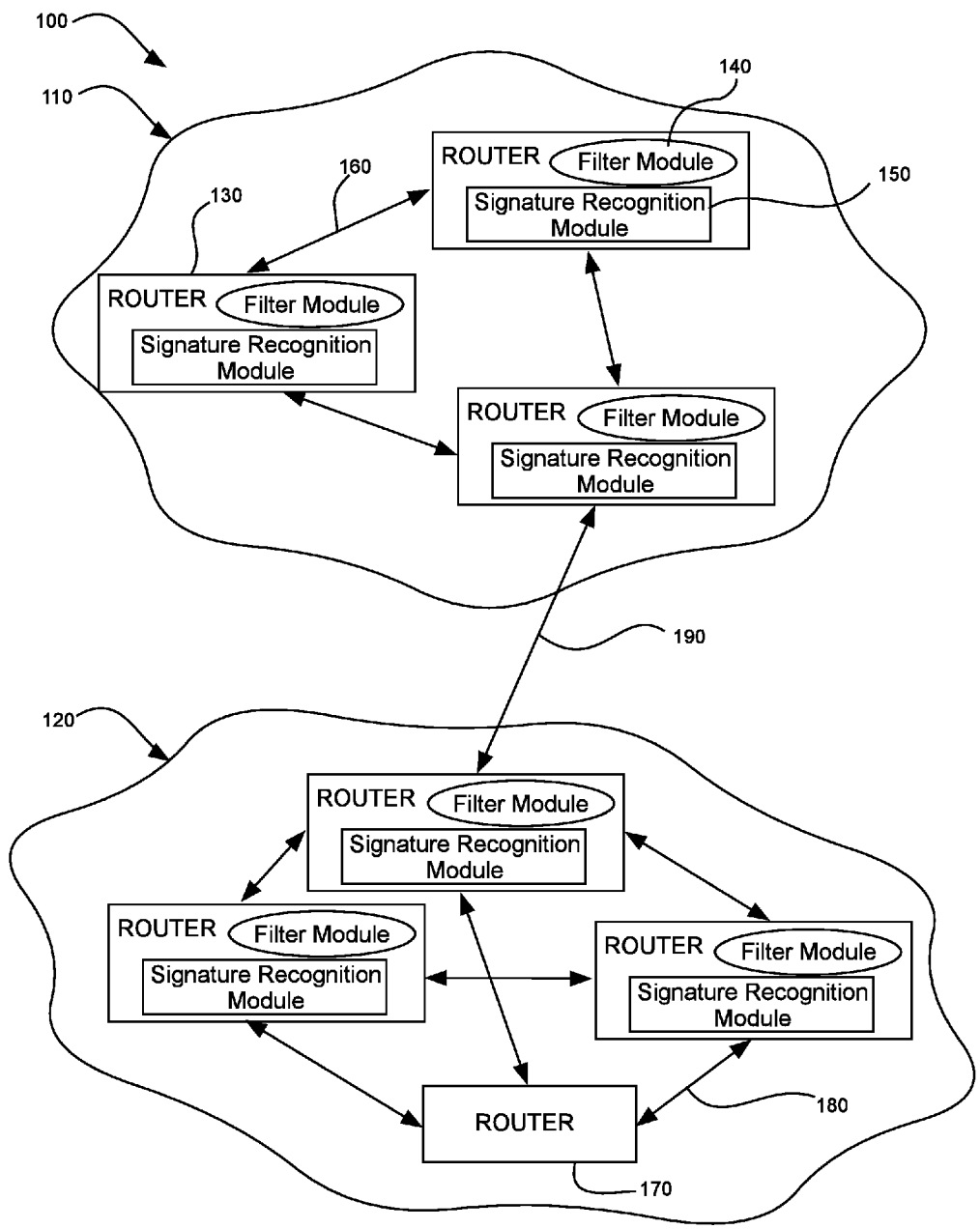
FIG. 1 is a diagram of an inter-router communication system in accordance with an embodiment of the present invention.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

The Internet is composed of multiple networks with each of the constituent networks under the control of different administrative entities. As problems such as viruses, worms, and denial of service attacks increasingly plague the Internet, there is an acute need for coordinated mechanisms to enable administrative entities or domains to work together to solve such problems. Another pressing need related to coordinated inter-domain efforts facing administrative entities is solving the problem of how to provide Quality of Service (QoS) routing between domains. While an increasing number of applications with end-to-end QoS requirements are emerging in the internet, there is virtually no support for inter-domain QoS routing. QoS routing is challenging in a decentralized Internet where administrative authority is shared among multiple autonomous systems.

As Internet peering relationships are shaped by economic forces among different administrative domains, it becomes even more necessary to have such coordinated mechanisms. For example, an Internet Service Provider (ISP) may have a contractual agreement with its customers to communicate signatures for worm patterns to customers who may get Internet service from more than one ISP so that the customer can fend off worm packets arriving through the other ISP. However, there are no mechanisms in the Internet which allow patterns such as worm signatures, distributed denial of service anomaly signatures, and others to be communicated across administrative domains.

Denial of service attacks are an example of a type of attack that could be reduced in number or eliminated by more coordinated efforts between administrative domains. A denial of service attack is a common method of attack where a victim machine is saturated with external communication requests in quantity and time sufficient to prevent the victim machine from responding to legitimate traffic. At the very least, such an attack can slow the response time of the victim machine to legitimate traffic. General symptoms of a denial of service attack include unusually slow network performance, unavailability of a web site, a dramatic spike in the number of spam emails received, and inability to access any web site.

One particular type of denial of service attack is a distributed denial of service (or DDoS) attack. In a DDoS attack, multiple compromised systems, also known as hosts or zombies, flood the bandwidth or resources of a targeted system. Generally, the target of a DDoS attack is one or more web servers. Essentially, the greatest point of difference between a denial of service attack and a DDoS attack is the scale. A single perpetrator acting with a single host mounts a denial of service attack, whereas a single attacker utilizing hundreds or thousands of host or zombie systems to simultaneously mount individual denial of service attacks which together amount to a DDoS attack. A DDoS anomaly signature is one that matches flows that comprise DDoS packets such as Transmission Control Protocol (TCP) SYN floods or Internet Control Message Protocol (ICMP) floods. In TCP, SYN is an attribute for synchronizing sequences, and a TCP SYN flood is where an attacker sends a succession of SYN requests to a target's system. An ICMP flood is where networked computers' operating systems are used to send a succession of error messages, such as that a requested service is not available, or that a host or router could not be reached.

The present system and method provides fast-path filtering activities such as worm-filtering and quality of service (QoS) marking. The present system and method can include a routing protocol communication system, or a routing protocol, or can be standards-compliant protocol extension of an existing protocol. One such existing protocol which may be used is the Border Gateway Protocol, or BGP. While much of the discussion herein is directed towards a system and method using BGP, the same scheme may be applied to other protocols as well.

Routing protocols can be used to exchange routing information between network routers. A router is a networking device whose software and hardware are usually tailored to the tasks of routing and forwarding packets of information. For example, on the internet, information is directed to various paths by routers. Routers operate in two different planes. There is a control plane, in which the router learns the outgoing interface that is most appropriate for forwarding specific packets to specific destinations. There is also a data forwarding plane, or simply "data plane", which is responsible for the actual process of sending a packet received on a logical interface to an outbound logical interface.

The invention is attuned to the requirements of performance-centric core routers of today. Specifically, the invention does not use complicated book-keeping as some other protocols or protocol extensions do and can work with existing scalable routing protocols. The invention is directed towards distributed coordination across administrative domains via data-plane filtering.

As there is a need for a way to communicate various signatures for viruses, DDoS attacks, worms, quality of service (QoS), and other signatures across administrative domains, a system is provided for inter-router communication of signatures. Referring to FIG. 1, the system 100 may include any number of network routers 130 on a network 110. The routers may be connected via an intranet or the internet. In one aspect, the networks 110 and 120 shown in FIG. 1 can represent intranet networks, internet networks, or a combination of intranet and internet networks. There may be a routing protocol communication sent between the routers 160. The routing protocol communication may include a data plane update packet sent with a route update packet. The data plane update packet can have routing attributes which correspond to information export protocol signatures.

There can be a signature recognition module 150 on at least one of the routers. This signature recognition module can store and recognize data packet signature patterns located in a payload of the data plane update packet. There can also be a data plane filter module 140 on at least one of the routers. The data plane filter module can handle data packets according to the received filtering signatures or rules for specific data packet signature patterns. It is also noted that the system is also compatible with routers and networking devices not implementing the invention. For example, in the network 120 shown in FIG. 1, a router 170 that does not have the processing modules of the present system is shown and is still able to pass and receive communication 180 to and from other routers.

It is noted that BGP ORF (Outbound Route Filtering) enables a control plane feature that allows a BGP router to export a list of prefixes that it wants filtered to its upstream neighbor. BGP ORF, however, is applicable only to route updates. The present invention allows filtering of arbitrary patterns rather than just filtering of Internet Protocol (IP) routes and may be applied on ALL packets on the fast path as opposed to only on routing updates.

In one aspect, one or more protocol extensions may be provided for BGP, the current dominant inter-domain routing protocol in the internet, in order to allow the exchange of patterns of malicious packets across autonomous internet systems. The invention need not only be used for passing malicious pattern signatures, but can also be used to communicate packet flow-patterns which should be tagged with a particular QoS level by its service provider domain when forwarding upstream by the upstream router. High-performance commercial routers have a distinct notion of a data-plane and a control-plane. Herein, patterns that need to be communicated to the upstream provider are referred to as data-plane filter patterns since these will be evaluated against every packet on the fast-path, usually using fast hardware mechanisms such as TCAMs (Ternary Content Addressable Memory). Also, BGP extensions which carry such patterns are referred to as BGP-DP (BGP Data-Plane extensions).

The BGP-DP protocol comprises extensions to BGP that allows BGP speakers (routers that implement BGP) to send and receive fast-path filter rules in the form of Type Length Value (TLV) fields. These TLV fields can contain an "anomaly pattern" which can be encoded and decoded in a standard manner by router end-points that understand BGP-DP.

Similar to BGP route-update packets, BGP-DP packets containing data-plane filtering patterns may be referred to as BGP-DP update packets. A BGP-DP update packet may contain a data-plane pattern field which in turn can comprise a compressed set of TLV values. A BGP-DP compatible router may have a signature recognition module which can store and recognize the various signature patterns. For DDoS anomaly signature patterns and QoS signatures, the various types (T) in the TLV fields that characterize particular flows may be the same types that are present in traffic flow information export standards, such as the IPFIX standard or the proprietary Cisco Systems Netflow standard. IPFIX, or Internet Protocol Flow Information Export, is a useful standard as it is a common, universal standard of export for Internet Protocol flow information from routers, probes, and other devices. The type (T) can include fields such as IPv4, next-hop information, BGP next-hop, TCP fields, source/destination Autonymous System (src/dst AS), multicast packet counts, source/destination Virtual Local Area Network (src/dst VLAN), Multiprotocol Label Switching (MPLS) label information, etc.

With regard to virus patterns, however, a router may apply analysis beyond just an analysis of information export protocol signatures. The router may analyze content deep in a payload of the packet. To address this issue, there may be a type (T) created for such deep packet content. This type may be called "Deep Packet Content" or any other suitable name. The Deep Packet Content type may comprise a set of compressed TLV fields with an additional offset sub-pattern. The TLV may be represented by a Type Length Offset Value tuple with the offset denoting a depth within the packet payload. In one aspect, the depth may be determined by a number representing a specific number of bytes into the packet payload and counting can start from the first byte of the packet. It is at this depth that a router using BGP-DP can analyze patterns for various virus signatures. In this way, highly detailed virus patterns can be specified using BGP-DP updates.

In addition to the data-plane patterns which can be included in a BGP-DP update packet as described above, each BGP-DP update packet can also have other useful attributes. A next hop attribute may be included which indicates the router from which the update packet was received. A router can be configured to propagate this next hop attribute to other routers on the network to dynamically update routing tables. Utility of this feature is described in more detail below. A set of attributes for measuring an interval or throughput threshold of data flows through the router may also be used. In one aspect this set of attributes may be in the form of Measurement Interval, Measurement Threshold. Attributes for rate-limiting may also be used. In one aspect, these may appear in the form of Rate-Limit Interval, Rate-Limit Threshold.

A BGP-DP compatible router may have a data plane filter module or forwarding module which can decode the TLV of BGP-DP update packets and program TCAM rules based on one or more signatures extracted from the update packet. Subsequently all packets in the data-plane are evaluated against the TCAM rules. The packets can then be forwarded, blocked, or rate-limited. The rules may be fashioned in any useful way. In one aspect, the router filter module may forward all packets which do not match any of the TCAM rules and block or rate-limit all packets which do match one or more rules. Rate-limiting can be useful to only rate-limit rather than completely block packets matching the specified signatures. The Rate-Limit Interval, Rate-Limit Threshold attributes may define a number of packets matching the field which are allowed to be forwarded by the filter module or forwarding module over a time interval of length Rate-Limit Interval.

In some instances, such as with DDoS attacks for example, it may be useful to deprogram the TCAM and stop blocking or rate-limiting packets that matched a particular signature once such packet flows return to a normal, safe flow. The Measurement Interval, Measurement Threshold attributes can again be used to accomplish this. When over a time-interval of Measurement Interval the observed packet measurement is less than a throughput threshold, a pattern withdrawal message can be sent to the BGP next hop from where the packet was received. This is one use for the next hop attribute described above where the attribute can indicate the router from which a packet was received and be passed to a forwarding next hop router. Thus a pattern withdrawal message may be transitively propagated by intermediate domains until it reaches the source domain. Intermediate routers that receive a pattern withdrawal message and have that pattern in memory can deprogram the anomaly signature from their memory or TCAM at this point. Generally the relationship between peering entities in the Internet will determine the flow of the BGP-DP updates. For example, service providers providing transit facilities for their customers will generally accept BGP-DP updates and could in turn propagate it to their peering domains. However, it is unlikely that anomaly signatures will propagate from a customer network beyond a Tier-1 ISP and his peers. Since the decision of withdrawing a pattern is initiated by each router independently based on receiving Throughput Threshold number of packets in Measurement Interval amount of time, the protocol can scale easily.

The problem of cascaded withdrawals that will follow immediately after a DDoS attack ceases can be solved using randomized time periods. The decision of whether to install a signature into router memory or a TCAM is a decision that peering domains may decide to make based on contractual agreements with local domain (peering or transit).

The present system and method is advantageous in that a protocol extension to a standard protocol such as BGP may be used so that anomaly signatures can be automatically transferred to all border routers in a local domain using internal BGP (IBGP) full-mesh configuration, as described in the BGP protocol. This may be much simpler than using an Interior Gateway Protocol (IGP) to distribute the flow patterns to all domain-edge network devices. Also, as described above and shown in FIG. 1, the present scheme works well with routers, networks, and other systems not implementing this invention. A router 170 not implementing the system or method can still communicate back and forth with other routers 130 that do implement the system or method. However, the router 170 cannot perform the same functions as the enhanced routers 130. The router 170 will continue to function in a network as it did prior to implementation of other enhanced routers into the network 120 or system.

It is also advantageous that hardware requirements for the present system are minimal as most commercial routers support fast-path mechanisms such as TCAMs, network processors, etc., that implement Access Control on the router. It is an advantage that each autonomous system is able to independently decide whether to install the pattern in its data-plane filter or not and whether to propagate upstream to other BGP peers or not. It is an advantage that the protocol scales easily to handle the challenges of Internet-wide deployment and does not require complicated book-keeping and large protocol state requirements.

Figure 2:
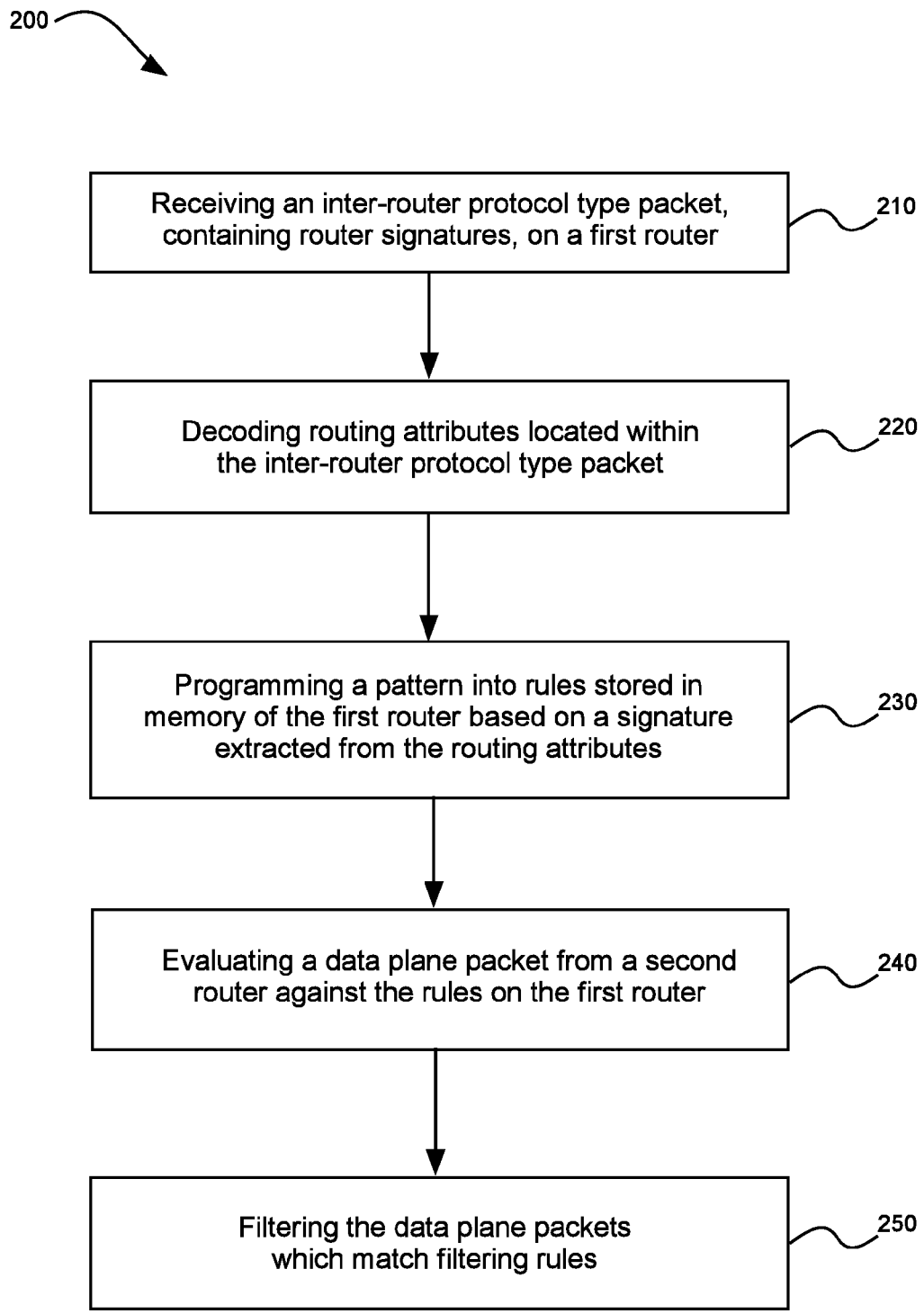
FIG. 2 is a flow chart of a method of inter-router communication in accordance with an embodiment of the present invention.

Referring to FIG. 2, the invention also provides a method of inter-router communication 200. As in block 210, the method includes receiving an inter-router protocol type packet, containing router control signatures, on a first router. Routing attributes located within the inter-router protocol type packet are decoded, as in block 220. The routing attributes can be decoded using a decoding module. A pattern is then programmed into rules stored in memory of the first router based on a signature extracted from the routing attributes, as in block 230. A data plane packet from a second router is evaluated against the rules on the first router, as in block 240. Data plane packets which match filtering rules are filtered, as in block 250.

In one aspect, the method can further comprise the first router receiving a next-hop attribute with the data plane packet, the next hop attribute denoting the second router, the router from which the data plane packet is received. A withdrawal message can be sent to this next hop to stop filtering when over a time interval a measurement of data plane packets is less than a throughput threshold. In one aspect, the pattern programmed into the rules comprises routing attributes corresponding to at least one of a DDoS anomaly signature pattern and a QoS signature pattern. In another aspect, the pattern may have an offset attribute together with other routing attributes, the offset denoting a depth within a payload of the data plane packet for evaluating virus patterns at the depth.

In one aspect of the above method, data plane packets not filtered may be forwarded, according to forwarding rules stored in the memory. A forwarding module may be included in the router for this purpose. In instances where a QoS attribute is associated with the data plane packet, the data plane packet will include a QoS signature pattern and data plane packets may be forwarded along QoS routes.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of inter-router communication, comprising:
receiving, in a first router, an inter-router protocol packet, containing router control signatures, wherein the inter-router protocol packet comprises a data plane update packet sent with a route update packet;
decoding routing attributes located within the inter-router protocol packet, wherein the routing attributes include a signature that corresponds to at least one of a denial of service anomaly signature pattern and a quality of service signature pattern, wherein the denial of service anomaly signature pattern is a signature pattern of a known malicious packet and the quality of service signature pattern is a signature pattern of a packet that is to be processed with a particular quality of service;

programming the at least one of the denial of service anomaly signature pattern and a quality of service signature pattern into rules stored in a memory of the first router;

evaluating, in the first router, a data plane packet received from a second router against the rules stored in the memory of the first router; and filtering, in the first router, data plane packets that match the rules stored in the memory of the first router.

2. The method in accordance with claim 1, further comprising:

receiving, in the first router, a next-hop attribute with the data plane packet, the next hop attribute denoting the second router from which the data plane packet is received.

3. The method in accordance with claim 2, further comprising:

sending a withdrawal message to the next hop to stop filtering when, over a time interval, a measurement of data plane packets is less than a throughput threshold.

4. The method in accordance with claim 1, wherein the routing attributes further comprise an offset attribute, wherein the offset attribute denotes a depth within a payload of the data plane packet for evaluating virus patterns at the depth.

5. The method in accordance with claim 1, further comprising forwarding data plane packets not filtered according to the rules stored in the memory.

6. The method in accordance with claim 5, wherein forwarding data plane packets further comprises forwarding data plane packets along quality of service routes according to a quality of service signature pattern in the data plane packet.

7. A router comprising:
a processor; and
a memory on which is stored instructions that cause the processor to:
receive a data plane update packet sent with a route update packet, wherein the data plane update packet has a next hop attribute denoting a router from which the data plane packet is received and routing attributes;
store the routing attributes, wherein the routing attributes include a signature that corresponds to at least one of a denial of service anomaly signature pattern and a quality of service signature pattern, wherein the denial of service anomaly signature pattern is a signature pattern of a known malicious packet and the quality of service signature pattern is a signature pattern of a packet that is to be processed with a particular quality of service;
receive a data plane packet having a data packet signature;
filter the received data plane packet in response to the data packet signature of the received data plane packet matching a data packet signature in the stored routing attributes; and
propagate the next hop attribute to other routers on a network to dynamically update routing tables.

8. The router in accordance with claim 7, wherein the instructions are further to cause the processor to send a withdrawal message to other routers in the network to stop filtering when, over a time interval, a measurement of data packets is less than a throughput threshold.

9. The router in accordance with claim 7, wherein the data plane update packet comprises routing attributes that differ from attributes in the route update packet.

10. The router in accordance with claim 9, wherein the instructions are further to cause the processor to recognize the routing attributes and to use the routing attributes to filter at least one of quality of service, viruses, worms, and denial of service attacks.

11. The router in accordance with claim 7, wherein the instructions are further to cause the processor to filter the received data plane packet by one of forwarding the received data plane packet, rate-limiting the received data plane packet, or blocking the received data plane packet.

12. A router for inter-router communication comprising:
a processor; and
a memory on which is stored instructions that cause the processor to:
receive an inter-router protocol packet containing router control signatures, wherein the inter-router protocol packet comprises a data plane update packet sent with a route update packet;
decode routing attributes located within the inter-router protocol packet, wherein the routing attributes include a signature that corresponds to at least one of a denial of service anomaly signature pattern and a quality of service signature pattern, wherein the denial of service anomaly signature pattern is a signature pattern of a known malicious packet and the quality of service signature pattern is a signature pattern of a packet that is to be processed with a particular quality of service; and
program the at least one of the denial of service anomaly signature pattern and the quality of service signature pattern into rules stored in the memory of the router.

13. The router in accordance with claim 12, wherein the routing attributes correspond to information export protocol signatures.

14. The router in accordance with claim 12, wherein the routing attributes further comprise an offset value denoting a depth within a payload of the data plane update packet for evaluating virus patterns at the depth.

15. The router in accordance with claim 12, wherein at least one of the routing attributes comprises a next-hop attribute denoting a router from which the data plane update packet was received.

16. The router in accordance with claim 15, further comprising a withdrawal module wherein the instructions are further to cause the processor to send a withdrawal message to the next hop to stop filtering when, over a time interval, a measurement of data plane packets is less than a throughput threshold.

17. The router in accordance with claim 12, wherein the instructions are further to cause the processor to handle data packets by one of forwarding the data packets, rate-limiting the data packets, or blocking the data packets.

* * * * *